United States Patent
Brinker

(10) Patent No.: US 6,200,620 B1
(45) Date of Patent: Mar. 13, 2001

(54) METHOD OF USING A MOLD TO MAKE HEART-SHAPED CAKE OR BREAD

(76) Inventor: Karl Brinker, Am Berg 11, D-44649 Herne (DE)

( * ) Notice: Subject to any disclaimer, the term of this patent is extended or adjusted under 35 U.S.C. 154(b) by 0 days.

(21) Appl. No.: 09/260,586

(22) Filed: Mar. 1, 1999

(30) Foreign Application Priority Data

Mar. 3, 1998 (DE) .............................................. 198 08 815

(51) Int. Cl.$^7$ .................................................. A21D 13/00
(52) U.S. Cl. .................. 426/389; 426/391; 426/512; 426/518; 426/503; 249/117
(58) Field of Search .................. 426/512, 518, 426/389, 391, 396, 549, 552, 503; 249/117, 119, 121, 129, DIG. 1

(56) References Cited

U.S. PATENT DOCUMENTS

| | | | | |
|---|---|---|---|---|
| D. 252,551 | * | 8/1979 | Keller | D7/44 |
| D. 257,116 | * | 9/1980 | Lakatos et al. | D7/96 |
| D. 342,144 | * | 12/1993 | Yang | D1/112 |
| D. 361,514 | * | 8/1995 | Krupa et al. | D9/456 |
| 1,565,887 | * | 12/1925 | Andrus . | |
| 1,696,343 | * | 12/1928 | Burdick . | |
| 2,092,857 | * | 9/1937 | Poulin . | |
| 2,280,059 | * | 4/1942 | Brustowsky . | |
| 4,121,510 | * | 10/1978 | Frederick | 99/425 |
| 4,195,747 | * | 4/1980 | Hare | 220/23.2 |
| 4,246,838 | * | 1/1981 | Pulver et al. | 99/516 |
| 4,279,573 | * | 7/1981 | Conti | 220/23.83 |
| 4,417,716 | * | 11/1983 | Penna et al. | 249/121 |
| 4,664,928 | * | 5/1987 | McCaffrey | 426/503 |

FOREIGN PATENT DOCUMENTS

| | | |
|---|---|---|
| 28 30 693 | 1/1980 | (DE) . |
| 80 33 087 | 8/1981 | (DE) . |
| 88 11 739 | 12/1988 | (DE) . |
| 3908212 | 5/1990 | (DE) . |
| 91 04 957 | 9/1991 | (DE) . |
| 92 04 262 | 7/1992 | (DE) . |
| 94 03 050 | 6/1994 | (DE) . |
| 196 18 545 | 11/1997 | (DE) . |
| 1109120 | 1/1956 | (FR) . |
| 1166787 | 11/1958 | (FR) . |

* cited by examiner

*Primary Examiner*—Milton Cano
*Assistant Examiner*—Sherry A. Dauerman
(74) *Attorney, Agent, or Firm*—Herbert Dubno; Andrew Wilford

(57) ABSTRACT

A mold has a pair of generally planar side walls having joined lower edges and extending upward from the lower edges at an acute angle to each other and a pair of generally triangular end walls crosswise to the side walls and forming therewith an elongated upwardly V-shaped cavity. A plurality of such side and end walls can be joined together at upper edges of the side walls to form a plurality of such cavities extending horizontally parallel to one another. Each cavity can be provided with at least one crosswise partition and a cover that is formed with a pair of parallel and downwardly open semicircular channels can be engaged over the mold for forming upwardly projecting bumps on risable dough cooked in the cavity. A heart-shaped foodstuff is made by first filling the V-shaped cavity with a mass of risable dough. After some rising of the dough a longitudinal cut is formed along a top of the dough mass and the dough mass with the cut top is cooked so the dough rises and forms a pair of longitudinally extending bumps. Then the cooked dough mass is demolded and is cut into slices each of heart shape.

2 Claims, 3 Drawing Sheets

FILLING MOLD

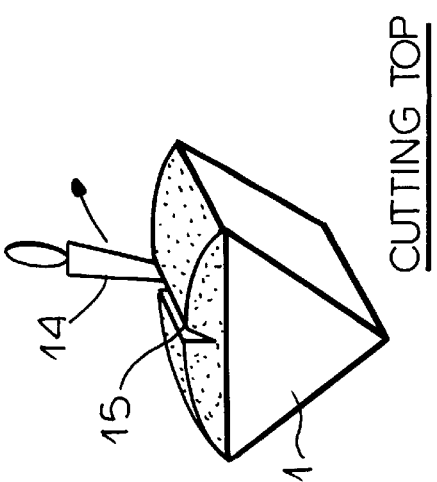
FIG.9A FILLING MOLD
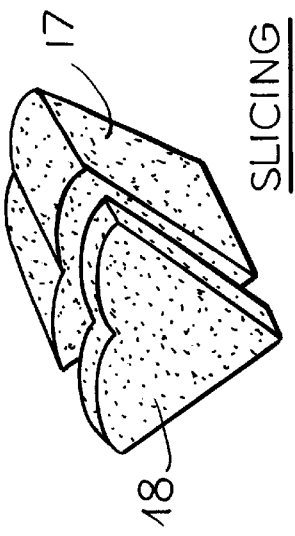
FIG.9B BAKING
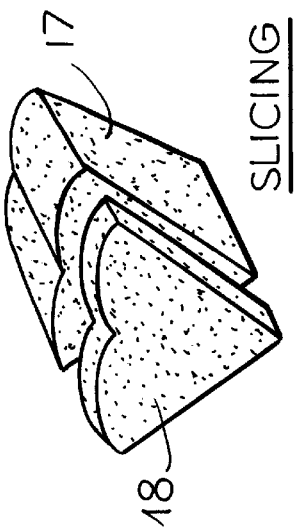
FIG.9C CUTTING TOP
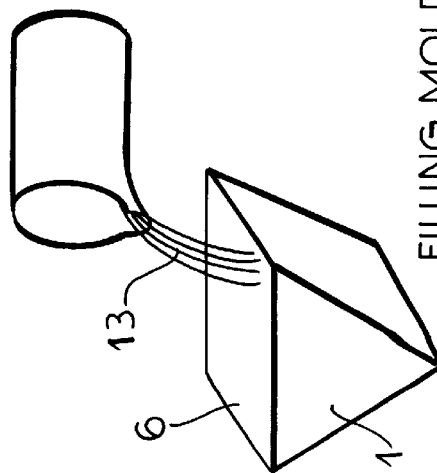
FIG.9D BAKING
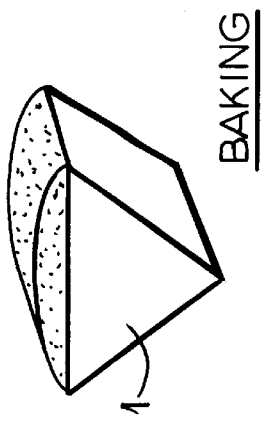
FIG.9E DEMOLDING
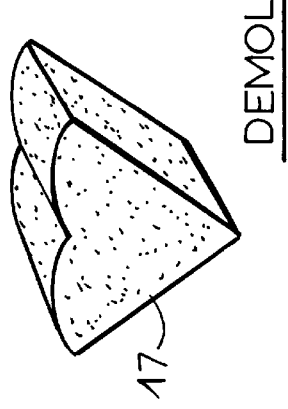
FIG.9F SLICING

METHOD OF USING A MOLD TO MAKE HEART-SHAPED CAKE OR BREAD

SPECIFICATION

FIELD OF THE INVENTION

The present invention relates to a foodstuff mold. More particularly this invention concerns such a mold and a method making a heart-shaped foodstuff, for instance a cookie, praline, bread, or cake.

BACKGROUND OF THE INVENTION

In order to produce a heart-shaped confection such as a cookie, cake, or praline, it is standard to pour a liquid dough or the like into a mold that is of heart shape seen from the top. Once the foodstuff is ready, either after baking or chilling, it is demolded and the mold can be reused.

Such a system is relatively inefficient. The molds take up quite a bit of space so only a limited number of them can be fit on an oven or refrigerator rack at one time. The result is a low production rate.

OBJECTS OF THE INVENTION

It is therefore an object of the present invention to provide an improved foodstuff mold.

Another object is the provision of an improved method of making a heart-shaped foodstuff.

SUMMARY OF THE INVENTION

A mold has according to the invention a pair of generally planar side walls having joined lower edges and extending upward from the lower edges at an acute angle to each other and a pair of generally triangular end walls crosswise to the side walls and forming therewith an elongated upwardly V-shaped cavity. A plurality of such side and end walls can be joined together at upper edges of the side walls to form a plurality of such cavities extending horizontally parallel to one another. Each cavity can be provided with at least one crosswise partition and a cover that is formed with a pair of parallel and downwardly open semicircular channels can be engaged over the mold for forming upwardly projecting bumps on risable dough cooked in the cavity.

A heart-shaped foodstuff is made according to the invention by first filling a V-shaped cavity of a mold having a pair of generally planar side walls having joined lower edges and extending upward from the lower edges at an acute angle to each other and a pair of generally triangular end walls crosswise to the side walls with a mass of risable dough. After some rising of the dough a longitudinal cut is formed along a top of the dough mass and the dough mass with the cut top is cooked so the dough rises and forms a pair of longitudinally extending bumps. Then the cooked dough mass is demolded and is cut into slices each of heart shape.

With this system, therefore, it is possible in effect to create a substantial number of the confections at one time. They are, in effect, cooked standing up in that the elongated workpiece they are cut from is of heart shape seen horizontally from the end. The result is an extremely cost-effective way to make heart-shaped cookies, cakes, breads, and the like.

BRIEF DESCRIPTION OF THE DRAWING

The above and other objects, features, and advantages will become more readily apparent from the following description, reference being made to the accompanying drawing in which:

FIGS. 9A through 9F are views illustrating the method of this invention.

SPECIFIC DESCRIPTION

Figure 1:
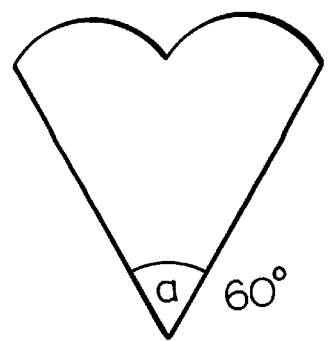
FIGS. 1, 2, and 3 are end views of molds according to the invention
Figure 2:
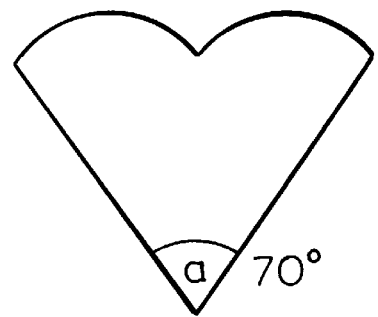
Figure 3:
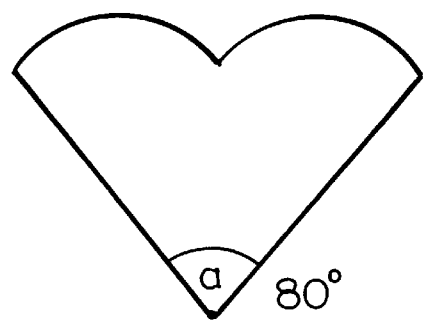
Figure 4:
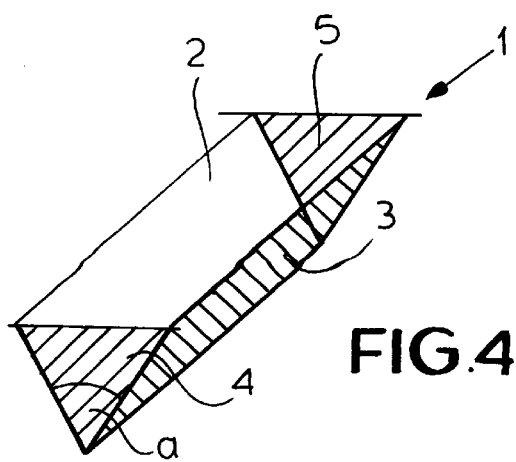
FIG. 4 is a perspective view of the mold.
Figure 5:
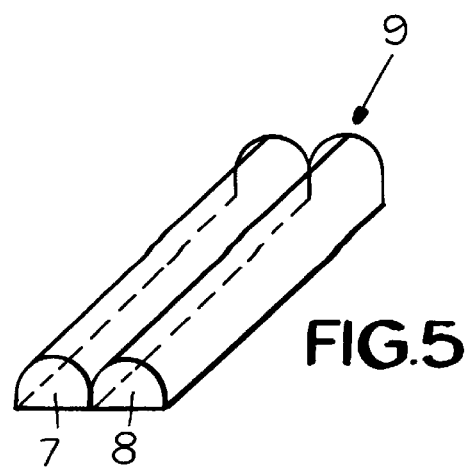
FIG. 5 is a perspective view of a mold top.

As seen in FIGS. 1 through 4, a mold 1 according to the invention can have a base angle $\alpha$ of 60° (FIG. 1), 70° (FIG. 2), or 80° (FIG. 3) defined between two side walls 2 and 3 (FIG. 4) and bounded by a pair of end walls 4 and 5 that together form a V-shaped elongated and upwardly open cavity 6. Such a mold 1 can be used together with a top 9 defining a pair of downwardly open semicircular-section channels 7 and 9.

Figure 6:
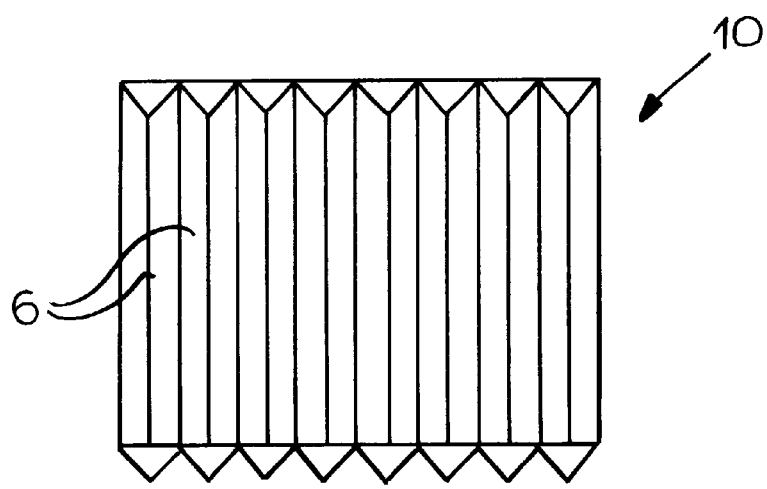
FIGS. 6, 7, and 8 are top views of further molds in accordance with the invention.
Figure 7:
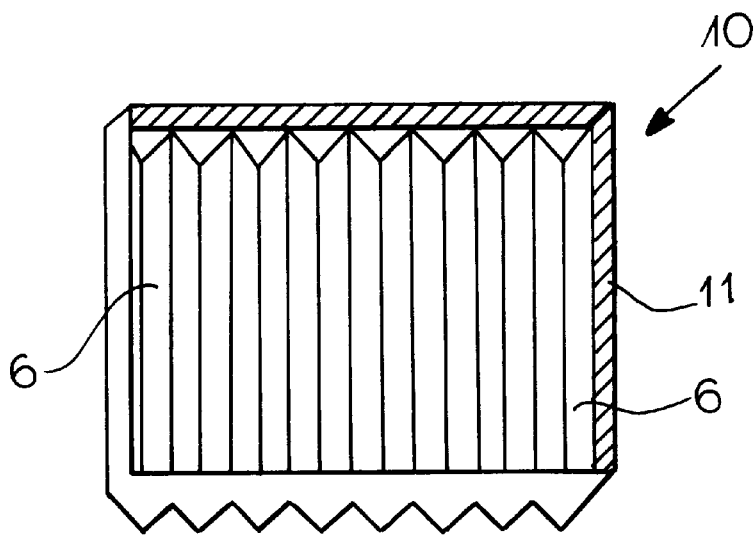
Figure 8:
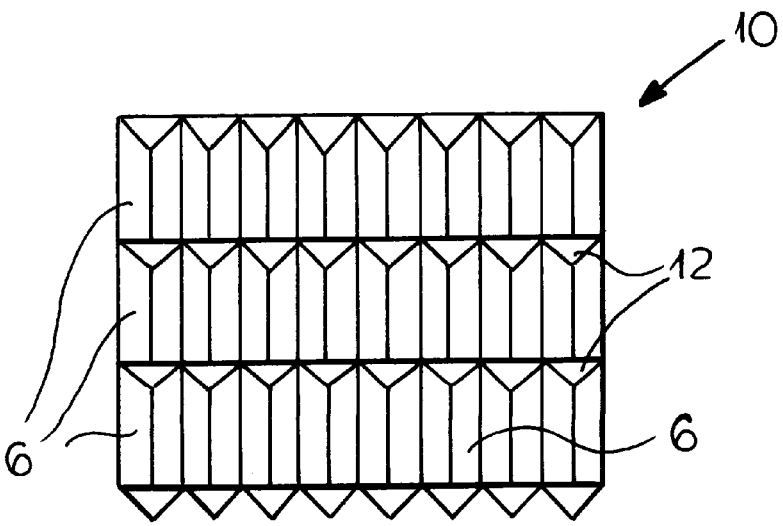

FIG. 6 shows how a plurality of such molds can be joined together to form an eight-cavity mold 10. In FIG. 7 the mold 10 has upper inwardly directed edges 11. The system of FIG. 10 has crosswise partitions 12 subdividing each of the cavities 6 into three compartments.

According to the invention as shown in FIG. 9A a heart-shaped foodstuff is made by first pouring risable bread or cake dough 13 into the mold cavity 6 of a mold 1. Then as shown in FIG. 9B the dough 13 is baked somewhat so it rises a little, then in FIG. 9C its top is cut by a knife 14 or the like to form a lengthwise slit 15 in it. After further baking as shown in FIG. 9D two bumps 16 are formed and then the finished article 17 is demolded as shown in FIG. 9E. Finally the elongated heart-section article 17 is cut into slices 18, each naturally also of heart shape.

I claim:

1. A method of making a heart-shaped cake or bread, the method comprising the steps of sequentially;

filling a V-shaped cavity of a mold having a pair of generally planar side walls having joined lower edges and extending upward from the lower edges at an acute angle to each other and a pair of generally triangular end walls crosswise to the side walls with a mass of risable dough;

after some rising of the dough forming a longitudinal cut along a top of the dough mass;

cooking the dough mass with the cut top so the dough rises and forms a pair of longitudinally extending bumps;

demolding the cooked dough mass from the mold; and slicing the cooked and demolded dough mass into slices each of heart shape.

2. A method of making a heart-shaped cake or bread, the method comprising the steps of sequentially;

filling a V-shaped cavity of a mold having a pair of generally planar side walls having joined lower edges and extending upward from the lower edges at an acute angle to each other and a pair of generally triangular end walls crosswise to the side walls with a mass of risable dough;

shaping a top of the dough mass so that when cooked it forms a pair of longitudinally extending bumps;

cooking the dough mass;

demolding the cooked dough mass from the mold; and slicing the cooked and demolded dough mass into slices each of heart shape.

* * * * *